P. G. WILLIAMS & A. W. ROOVERS.

Said ROOVERS assignor to said WILLIAMS.

COIN OPERATED INDUCTION COIL.

No. 10,949. Reissued July 24, 1888.

Inventors,

Percy G. Williams.
Alfred W. Roovers.
By their Attys
Gifford & Brown.

Witnesses
M. J. Roach.
Geo Wadman

N. PETERS, Photo-Lithographer, Washington, D. C.

P. G. WILLIAMS & A. W. ROOVERS.

Said ROOVERS assignor to said WILLIAMS.

COIN OPERATED INDUCTION COIL.

No. 10,949. Reissued July 24, 1888.

Witnesses.
M. J. Roach.
G. Wadman.

Inventors.
P. G. Williams.
A. W. Roovers.
By their attys.
Gifford & Throve.

N. PETERS, Photo-Lithographer, Washington, D. C.

P. G. WILLIAMS & A. W. ROOVERS.

Said ROOVERS assignor to said WILLIAMS.

COIN OPERATED INDUCTION COIL.

No. 10,949. Reissued July 24, 1888.

Witnesses.
Maurice J. Roach.
Geo. Wadman.

Inventors.
Percy G. Williams.
Alfred W. Roovers.
By their attys.
Gifford & Brown.

N. PETERS, Photo-Lithographer, Washington, D. C.

UNITED STATES PATENT OFFICE.

PERCY G. WILLIAMS AND ALFRED W. ROOVERS, OF BROOKLYN, NEW YORK; SAID ROOVERS ASSIGNOR TO SAID WILLIAMS.

COIN-OPERATED INDUCTION-COIL.

SPECIFICATION forming part of Reissued Letters Patent No. 10,949, dated July 24, 1888.

Original No. 372,441, dated November 1, 1887. Application for reissue filed January 20, 1888. Serial No. 261,427.

*To all whom it may concern:*

Be it known that we, PERCY G. WILLIAMS, of Brooklyn, in the county of Kings and State of New York, and ALFRED W. ROOVERS, of the same place, have invented a certain new and useful Improvement in Coin Operated Induction-Coils, of which the following is a specification.

Our improvement relates to machines in which a coin of a certain weight is employed to cause the machine to operate.

We will describe our improvement in detail, and then point out the novel features in claims.

Figure 1:
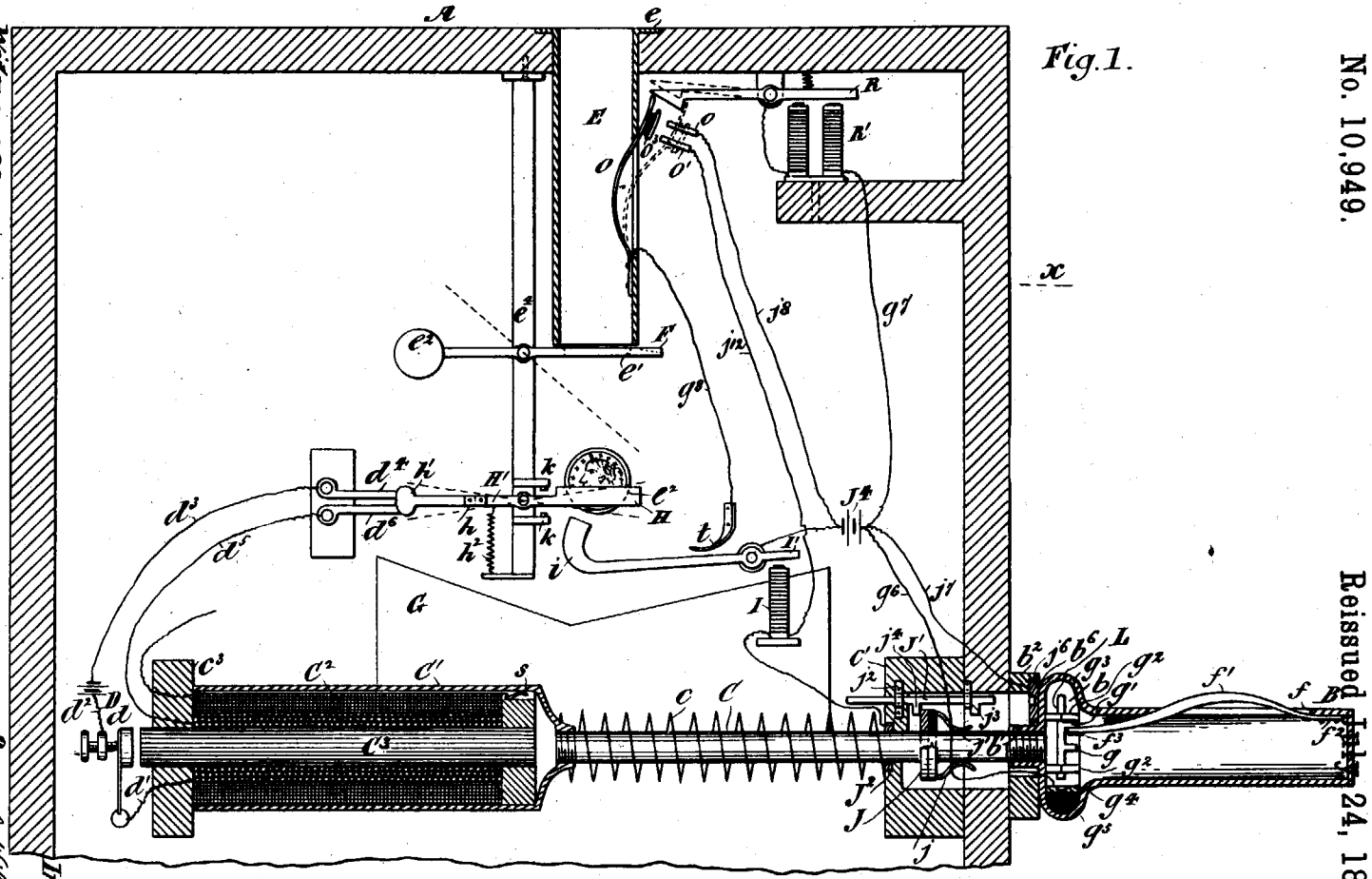
Figure 2:
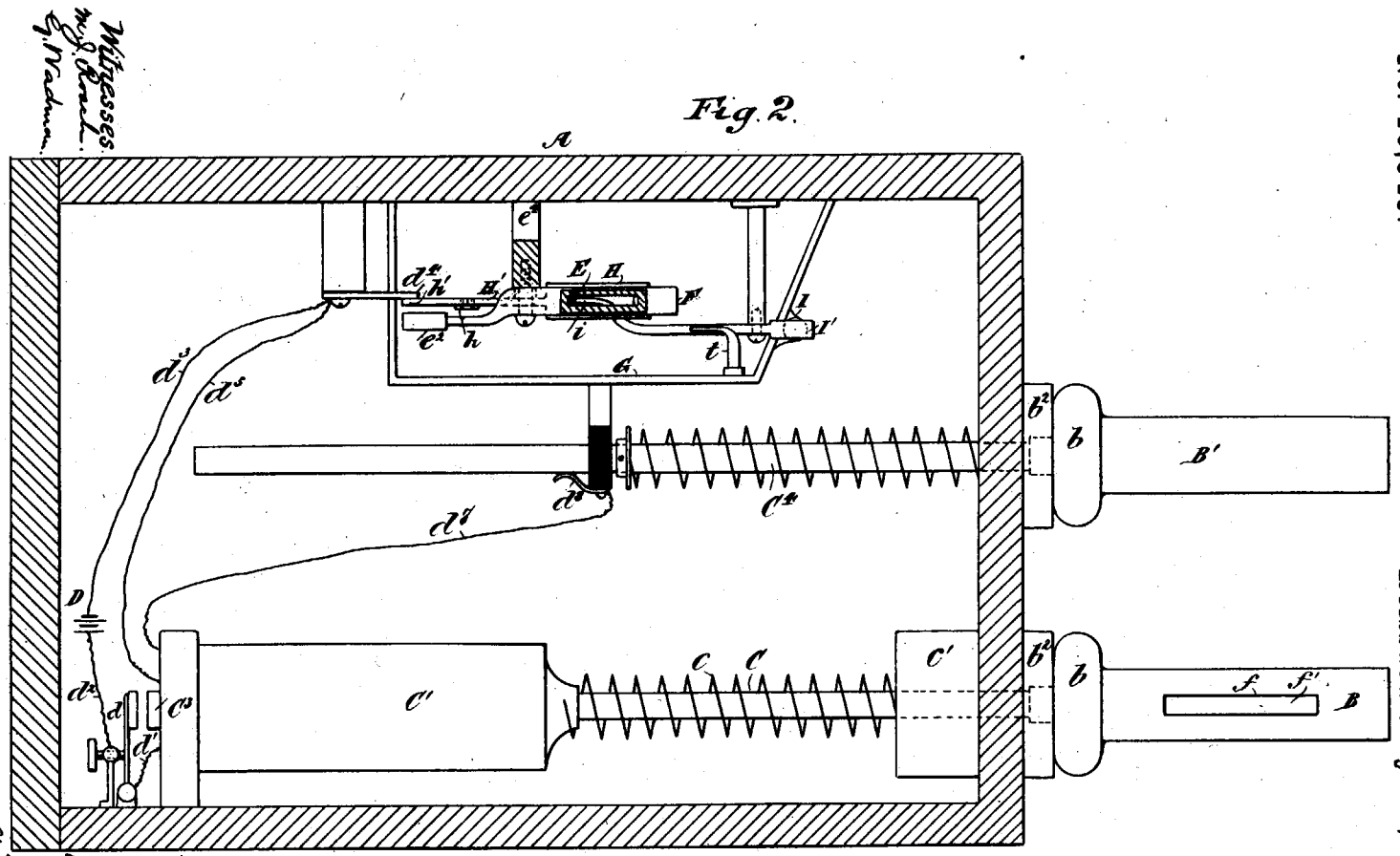
Figure 4:
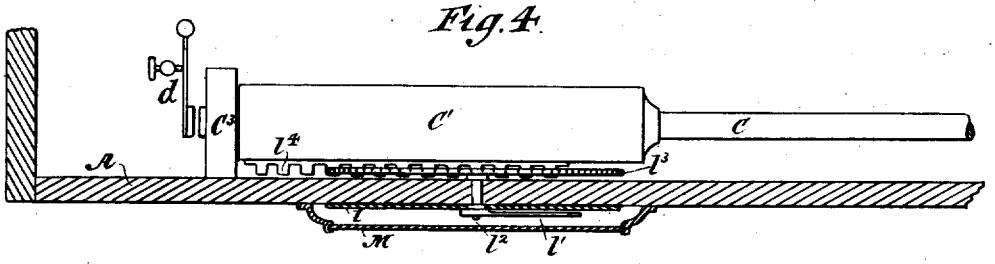
Figure 3:
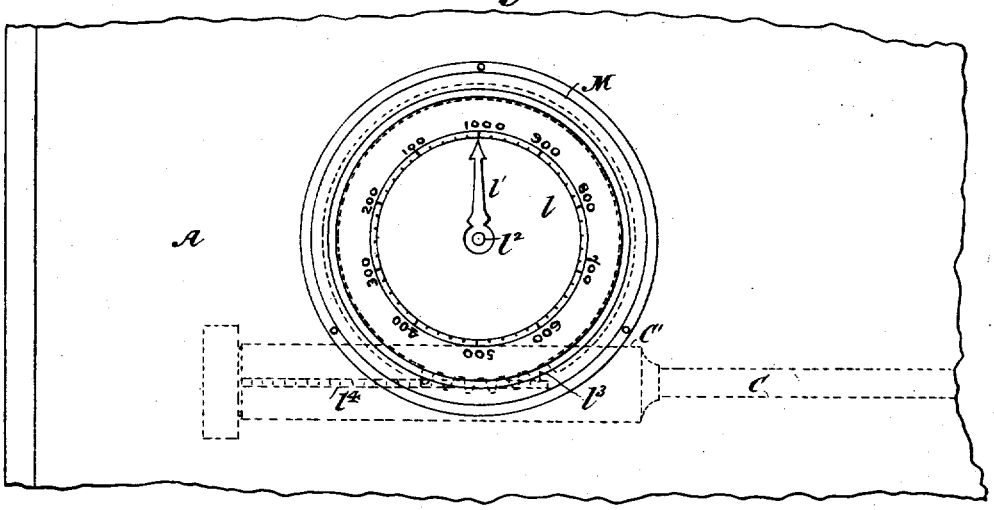
Figure 5:
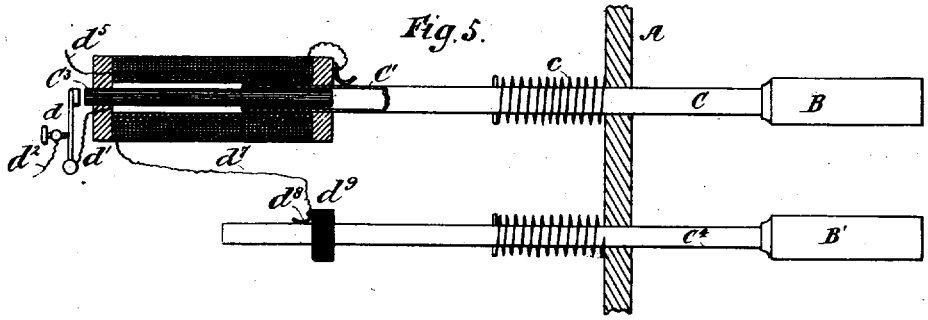

In the accompanying drawings, Figure 1 is a vertical section of a machine embodying our improvement. Fig. 2 is a horizontal section of the same, taken on the plane of the line *x x*, Fig. 1. Fig. 3 is a side view, and Fig. 4 a plan view, partly in section, of a certain indicator and its coacting parts with which the machine is provided. Fig. 5 is a view of an induction-coil and certain parts employed therewith of modified form, the same being partly in section.

Similar letters of reference designate corresponding parts in all the figures.

A designates the case of the machine. It may be made of wood, and may be rectangular or of other desired shape.

Referring first to Figs. 1 and 2, B B′ designate handles constituting electrodes. They are arranged outside the case. At least one of these handles is hollow, and both are made of metal—as, for instance, brass. As shown, they are cylindrical, and longitudinally movable. That one of these handles which we have illustrated in Fig. 1 as being hollow is provided with an enlarged portion, *b*, adjacent to the case A. From this enlarged portion a hollow boss, *b′*, extends inwardly and is adapted to enter a suitable aperture formed in a block, $b^2$, affixed to the case. This boss is internally screw-threaded, and has connected to it one end of a metal draw-rod, C, which rod has in turn a screw-threaded connection with a metal shell, C′, surrounding an induction-coil, $C^2$, and in electrical contact therewith by a spring, *s*, extending from one end of the secondary coil. By withdrawing the handle B the shell C′ of the induction-coil may be drawn therefrom to a desired extent. When the handle B is released, the shell will be retracted to the position shown in Fig. 1 by a coil-spring, *c*, surrounding the draw-rod C, and abutting at one end against said shell and at the other against a block, *c′*, preferably of wood, affixed to the inner side of the case A. When the shell C′ is withdrawn, the induction-coil and its core $C^3$ remain stationary, the latter being firmly secured, as shown, by friction in a suitable aperture extending through a block of wood, $c^3$, affixed to the inner side of the case A. The portion of the core which thus extends through the block $c^3$ extends beyond such block for a distance and in close proximity to an adjustable vibrator of ordinary construction, *d*. A wire, *d′*, leads from the vibrator to the primary coil of the induction-coil, and a wire, $d^2$, from the vibrator to a battery, D. A wire, $d^3$, leads from the battery D to a contact-piece, $d^4$, affixed to an upright forming part of the case A, and a wire, $d^5$, extends from another and similar contact-piece, $d^6$, back to the primary coil of the induction-coil. When connection is made between the contact-pieces $d^4$ $d^6$, the circuit just described is closed and the induction-coil becomes energized. The handle B′ is similar to the handle B as thus far described, and is provided with a similar draw-rod, $C^4$. A wire, $d^7$, leads from a spring, $d^8$, secured to a ring of insulated material, $d^9$, and bearing at one end against this draw-rod to the secondary coil of the induction-coil. When one grasps the handles B B′, a circuit is completed on the induction-coil, and the person grasping the handles will receive an electric shock.

In the induction-coil of modified form illustrated in Fig. 5 the shell C′ forms part of the rod C, and instead of surrounding the induction-coil surrounds the core thereof, and may be slid freely to and fro on said core. It of course does not contact with the primary coil of the induction-coil. A spring, *s*, connected with one end of the secondary coil bears against the draw-rod and shell C C′. The balance of the circuit is completed in manner previously described.

It is one of the objects of our improvement to automatically cause the induction-coil to become energized by causing electrical connection to be established between the contact-pieces $d^4$ $d^6$ upon the introduction of a coin of a certain weight and size into the case A. We will now describe this operation.

E designates an oblong shaft extending into the interior of the case through a suitable aperture in the top thereof. This shaft is supported at its upper end by a flange, *e*, extending over the adjacent surface of the case. Down this shaft a coin may be dropped.

F designates a lever fulcrumed to a rib, $e^4$, on the interior of the case. One arm of this lever extends beneath the lower end of the shaft E, and is provided with a longitudinal slot, $e'$. The other arm of the lever is weighted, as at $e^2$, whereby the arm which extends beneath the shaft is maintained against the same. The slot $e'$ is sufficiently large to admit of a coin of a certain size passing through it without canting the lever—say, a coin of the denomination known as the "nickel five-cent piece." If a coin of greater size and weight be dropped down the shaft, it will not pass through the slot $e'$, and will cause the lever F to rock on its fulcrum, as shown in dotted outline, whereby the coin will be thrown out and will fall into a receptacle, G, beneath it. If the coin is too small, it will fall through the slot $e'$ and also through a slot, $e^2$, formed in a plate, H, constituting one arm of a lever, H H', fulcrumed on the rib $e^4$ below the lever F and into the receptacle G. If the coin be of the proper size and weight, it will pass through the slot $e'$ and will lodge in the slot $e^2$ in the plate H. The portion H' of the lever H H' is made, as shown, in two sections, which sections are secured together by a flat spring, *h*, so that the outer of these sections may be deflected laterally. This outer section is provided with an enlarged portion, $h'$. Normally the lever H H' occupies the position (shown in dotted lines in Fig. 1) below the contact-pieces $d^4$ $d^6$; but when a coin of proper weight has lodged in the slot $e^2$ it is rocked into such position as to bring the enlarged portion $h'$ thereof into contact with the contact-pieces $d^4$ $d^6$, whereby circuit is closed on the induction-coil. The deflection of the outer section of the portion H' of the lever H H' enables the enlarged portion *h* to pass by the contact-pieces $d^4$ $d^6$, as may be necessary when a coin of greater weight than desired strikes the plate H after having been dropped down the shaft E. The circuit will in such case be only closed momentarily on the induction-coil. Of course if the contact-pieces $d^4$ $d^6$ were resilient the portion H' of the lever might be made rigid and a like result would be obtained. A spring, $h^2$, secured to the portion H' of the lever H H', and at the other end to a projection on the rib $e^4$, serves to retract the lever to its normal position after having been operated. Stops *k* limit the movements of the lever.

It will be seen from the foregoing that the induction-coil cannot be energized so as to cause an electric shock to be transmitted to a person grasping the handles B B' unless a coin of proper weight and size be first dropped down the shaft E.

Assuming that a coin of proper weight and size has been dropped down the shaft and the induction-coil has become energized, as described, a person grasping the handles B B' may withdraw them as far as desired and continue to receive an electric shock so long as the handles are grasped. When the grasp is removed and the handles are retracted by the spring, as described, it is desirable to throw out the coin from the plate H. This is accomplished in the following manner:

I designates an electro-magnet, which may be secured to the interior of the case of the machine in any suitable manner. I' designates an armature therefor. This armature constitutes a lever fulcrumed on the case. Its short arm extends in close proximity to the magnet. Its long arm has, as shown, an enlarged portion, *i*, constituting a striker or hammer, which extends beneath the plate H. When the magnet I is energized and the armature attracted, the hammer *i* will be caused to strike a coin in the plate H and throw it out, whereupon it will fall into the receptacle G. When this has occurred, the portion H' of the lever H H' will be withdrawn from contact with the contact-pieces $d^4$ $d^6$, and circuit will be broken and the induction-coil de-energized. It cannot be again energized until another coin of suitable size and weight has been dropped onto the plate H.

We cause the operation of the electro-magnet I in the following manner:

J designates a collar surrounding the draw-rod C and fitting quite snugly thereon. One side of this collar is insulated by a ring of india-rubber or other suitable insulating material, *j*. Springs $j'$, secured at one of their ends to the insulated portion *j* of the collar and bearing at their other ends against the draw-rod C, tend to center the collar.

J' designates a sliding contact-piece sliding in suitable guides, $j^2$, secured to the case and the block $c'$. This contact-piece is provided with two downwardly and outwardly extending projections, $j^3$ $j^4$. One of these is upon one side of the collar J and the other upon the other side of the same.

When the draw-rod C is withdrawn, it carries with it the collar J, the insulated portion $j'$ of which will come in contact with the projection $j^3$ on the contact-piece J' and move the latter until its projecting end is moved into a socket formed in a metal block, $j^5$, inset, as shown, in the block $b^2$. If a further outward movement of the draw-rod C then occurs, it will be drawn through the collar J, the latter remaining stationary. If now the grasp on the handle B is removed and the draw-rod C is retracted by the spring, the collar will be moved with it until its metal portion comes in contact with the projection $j^4$ on the sliding contact-piece. When the collar J is thus brought in contact with the projection $j^4$, the contact-piece J′ remains for an instant in contact with the block $j^6$. A circuit is then formed on the electro-magnet I through a wire, $j^7$, leading from the block $j^6$ to a battery, $J^4$, a wire, $j^8$, leading from such battery, a contact-piece, *o*, thence through an insulated piece, *o′*, thence by a wire, $j^{12}$, to the electro-magnet, a wire, $j^9$, leading from the electro-magnet L to a metal ring, $J^2$, inset in the block *c′* and surrounding the draw-rod C in close contact therewith, the draw-rod C, the collar J, and the contact-piece J′. The circuit thus closed is of sufficient duration only to energize the electro-magnet I and cause the operation of the hammer *i*.

We sometimes wish to cause the induction-coil $C^2$ to be de-energized without the handle B and draw-rod C being necessarily retracted to their full extent. This may occur if the grasp on the handle be relaxed without necessarily being wholly loosened. To accomplish this result, we provide the handle B with a longitudinal slot, *f*. As shown, this slot is upon the upper side of the handle B. Into the slot extends a piece of metal, *f′*, constituting a push-piece, and here shown as bow-shaped. A portion of this push-piece extends normally above the adjacent surface of the handle. Near one end this piece of metal *f′* is affixed to a flat spring, $f^2$, which latter is in turn secured to the handle B upon the inner side of the latter. When the handle B is grasped, the piece of metal *f′* will be pressed inward, and when the grasp is removed the spring $f^2$ will return to its normal position. The other or free end of the metal piece *f′* is provided upon one side—as here shown, the under side—with a piece of india-rubber or other suitable insulating material, $f^3$. This end of the metal piece extends between two projections, *g g′*, on a metal sliding contact-piece, L, arranged vertically, as shown, and adapted to be moved to and fro in guides $g^2$, secured to a plate, $g^3$, affixed to the enlarged portion *b* of the handle B upon the interior thereof. The contact-piece fits snugly in the guides $g^2$. When the metal piece *f′* is depressed, the insulated piece $f^3$ thereon contacts with the projection *g* on the contact-piece L and moves the latter downwardly until its lower end is moved into a suitable recess formed in a piece of metal, $g^4$, secured to a piece of insulating material, $g^5$, in the lower part of the enlarged portion *b* of the handle. If the grasp upon the handle B be relaxed sufficiently to allow the metal piece *f′* to spring upwardly, the metallic portion of the piece *f′* is brought in contact with the projection *g′* on the contact-piece. When this contact is made, the contact-piece L will remain for an instant in contact with the metal piece $g^4$ before being moved out of such contact by the continued upward movement of the metal piece *f′*. A circuit is thus closed on the electro-magnet I, which includes a wire, $g^6$, extending from the piece $g^4$ to the battery $J^4$, the wire $j^8$, contact-piece *o*, spring O, contact piece *o′*, wire $j^{12}$, the wire $j^9$, the ring $J^2$, the draw-rod C, the handle B, the metal piece *f′*, and the sliding contact-piece L. When this circuit is closed, the hammer *i* will be operated to throw the coin out of the plate H and the induction-coil will be de-energized.

When the handles B B′ occupy a normal position, or that shown in Fig. 1, we desire to prevent the energizing of the electro-magnet I, except when a coin of proper size and weight has been dropped down the shaft E. To accomplish this, we provide the curved spring O, secured near one end upon the inside of the shaft E, and having its free end extending through a longitudinal slot in the shaft. A coin of proper size, passing down the shaft, forces the spring outwardly through the slot, and into such position that its free end will engage a tooth on an armature, R, of an electro-magnet, R′, and the metal piece $O^3$ will be brought in contact with the contact-pieces *o o′*. A wire, $g^7$, leads from the magnet R′ to the battery $J^4$. When the circuit is closed on the magnet I in either of the ways just previously described, the armature I′ will be brought in contact with a contact-piece, *t*, connected by a wire, $g^3$, with the spring O. Circuit is thereby closed on the magnet R′, whereby the armature R is attracted and the spring O released. If, however, the handle B be withdrawn or the push-piece *f′* be operated without the spring O having first been engaged with the armature R by passing coin, the magnet I will not be energized, because the circuit will remain open.

We employ an indicator, M, for the purpose of indicating by arbitrary numbers the strength of an electric current which a person operating the machine can take. This indicator is affixed to the exterior of the case A, and comprises a cylindric case in which is arranged a dial-plate, *l*, upon which are delineated certain numbers and marks in a circle. A pointer, *l′*, extends over the numbers and marks, and is adapted to transcribe a circle about the dial. The pointer is mounted on an arbor, $l^2$, journaled in a suitable bearing in the side of the case A. Upon the portion of the arbor which extends inside the case is mounted a pinion, $l^3$.

It is well known in a certain class of electric machines for electro-medical treatment, that the farther the core of the induction-coil is withdrawn the stronger will be the shock experienced by the person being operated upon. The same result is attained in our machine by moving the shell C′ more or less off from the induction-coil by withdrawing the handle B. The shell C′, as shown in Figs. 3 and 4, is provided upon one side with a rack, $l^4$, with which the pinion $l^3$ engages. As the shell is moved along on the induction-coil, the pinion is rotated and the pointer moved over the numbers and marks. It will be clear that in order to increase the shock the electrode B only need be longitudinally movable.

It will be seen that by our improvement we produce an electric machine capable of administering an electric shock to a person, but which cannot be rendered operative unless a coin of certain weight and size has been first dropped into the machine. In this machine, also, the electric current which the person being operated upon receives may be regulated entirely by himself by simply withdrawing or pushing in one of the electrodes through which he receives the current.

What we claim as our invention, and desire to secure by Letters Patent, is—

1. The combination, with a case, of an induction-coil, an electric battery for energizing the same, contact-pieces, a normally-open electric circuit comprising the primary of the induction-coil, the battery, and said contact-pieces, a rocking lever adapted to be rocked into contact with said contact-pieces and close the said circuit upon a coin of desired weight and size lodging upon said lever until said coin is removed, a longitudinally-movable part in electrical contact with the secondary of the induction-coil, and two electrodes outside the case, one of said electrodes being longitudinally movable and rigidly connected with said longitudinally movable part, substantially as specified.

2. The combination, with a case, of an induction coil, an electric battery for energizing the same, contact-pieces, a normally-open electric circuit comprising the primary coil of the induction-coil, the battery, and said contact-pieces, and a rocking lever adapted to be rocked into contact with said contact-pieces and close the said circuit upon a coin of desired weight and size lodging upon said lever until said coin is removed, substantially as specified.

3. The combination, with a case, of an induction-coil, an electric battery for energizing the same, contact-pieces, a normally-open electric circuit comprising the primary coil of the induction coil, the battery, and said contact-pieces, and a rocking lever adapted to be rocked into contact with said contact-pieces and close said circuit upon a coin of certain size and weight lodging upon said lever until said coin is removed, and to be moved past said contact-pieces upon a coin of greater weight than desired falling upon the lever, substantially as specified.

4. The combination, with a case, of an induction-coil, an electric battery for energizing the same, an electrical circuit, a lever adapted to be moved by a coin of certain weight to close said circuit and energize the induction-coil, an electro-magnet, an armature for the same, comprising a striker, a battery for energizing the electro-magnet, a circuit therefor, a movable part in contact with the secondary of the induction-coil, an electrode outside the case, and a connection between the electrode and said movable part, which when moved in one direction will cause the circuit on the electro-magnet to be closed, and thereby cause said striker to strike the coin, substantially as specified.

5. The combination, with a case, of an induction-coil, an electric battery for energizing the same, an electric circuit comprising the primary coil of the induction-coil, a lever adapted to be moved by a coin of certain weight to close said circuit and energize the induction-coil, an electro-magnet, an armature for the same, comprising a striker, a battery for energizing the electro magnet, a circuit therefor, an electrode outside the case, a press-piece connected with said electrode, and a switch adapted to be moved by said press-piece to close said last-named circuit, energize the electro-magnet, and cause said striker to strike the coin, substantially as specified.

6. The combination, with a case, of an induction-coil, an electric battery for energizing the same, an electrical circuit comprising the primary coil of the induction-coil, a lever adapted to be moved by a coin of certain weight to close said circuit and energize the induction coil, an electro-magnet, an armature for the same, comprising a striker, a battery for energizing the electro-magnet, a circuit therefor, a movable part in contact with the secondary of the induction-coil, an electrode outside the case, and a connection between the electrode and said movable part, which when moved in one direction will cause the circuit on the electro magnet to be closed, a contact-piece adjacent to said armature, another electro-magnet, an armature therefor comprising a catch, a shaft down which a coin is to be dropped, and a spring extending into said shaft, adapted to be pressed outward by passing coin into a position where it will be secured by said catch, all being arranged and combined substantially as described, whereby when the first-named electro-magnet is energized and its armature attracted circuit will be closed on the second-named electro-magnet and said spring be released from the catch.

7. The combination, with a case, of an induction-coil, an electric battery for energizing the same, an electric circuit comprising the primary coil of the induction-coil, a lever adapted to be moved by a coin of certain weight to close said circuit and energize the induction-coil, an electro-magnet, an armature for the same comprising a striker, a battery for energizing the electro-magnet, a circuit therefor, an electrode outside the case, a press-piece connected with said electrode and switch, adapted to be moved by said press-piece to close said last-named circuit and energize the electro-magnet, a circuit therefor, a contact-piece adjacent to said armature, another electro-magnet, an armature therefor comprising a catch, a shaft down which a coin is to be dropped, and a spring extending into said shaft, adapted to be pressed outward by a passing coin into a position where it will be secured by said catch, all being arranged and combined substantially as described, whereby when the first-named electro-magnet is energized and its armature attracted circuit will be closed on the second-named electro-magnet and said spring be released from the catch.

8. The combination, with a case, of an indicator arranged upon the exterior thereof, and comprising a pointer, an arbor on which said pointer is mounted, a pinion on said arbor, an induction-coil, a longitudinally-movable shell on said induction-coil, provided with a rack engaging said pinion, and a longitudinally-movable handle upon the outside of the case, directly connected with the shell and in line with the induction-coil, for moving said shell in one direction, substantially as specified.

PERCY G. WILLIAMS.
ALFRED W. ROOVERS.

Witnesses:
D. H. DRISCOLL,
M. J. ROACH.